US011199040B2

(12) United States Patent
Yazawa et al.

(10) Patent No.: US 11,199,040 B2
(45) Date of Patent: *Dec. 14, 2021

(54) ROTATION TRANSMISSION MECHANISM AND DAMPER DEVICE

(71) Applicant: NIDEC SANKYO CORPORATION, Nagano (JP)

(72) Inventors: Takehiko Yazawa, Nagano (JP); Hiroyuki Iwashita, Nagano (JP); Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 401 days.

This patent is subject to a terminal disclaimer.

(21) Appl. No.: 16/136,888

(22) Filed: Sep. 20, 2018

(65) Prior Publication Data

US 2019/0093409 A1 Mar. 28, 2019

(30) Foreign Application Priority Data

Sep. 25, 2017 (JP) ............................ JP2017-183715

(51) Int. Cl.
*F16H 33/02* (2006.01)
*E05F 15/614* (2015.01)
(Continued)

(52) U.S. Cl.
CPC .............. *E05F 15/614* (2015.01); *E05F 5/00* (2013.01); *F25D 17/045* (2013.01);
(Continued)

(58) Field of Classification Search
CPC ........ E05F 15/614; E05F 5/00; F25D 17/062; F25D 17/045; E05Y 2201/21;
(Continued)

(56) References Cited

U.S. PATENT DOCUMENTS 4,515,026 A * 5/1985 Perkins .................. F16H 37/12
475/151
4,743,938 A * 5/1988 Ohno ................. G03G 15/0896
399/227

(Continued)

FOREIGN PATENT DOCUMENTS

JP 10306970 A 11/1998
JP 2017104121 A 6/2017

*Primary Examiner* — Chi Q Nguyen
(74) *Attorney, Agent, or Firm* — Cantor Colburn LLP

(57) ABSTRACT

A rotation transmission mechanism may include a plurality of rotation transmission members having a drive wheel and a driven wheel, and an urging member which urges the driven wheel in a reverse direction to a rotational direction by power of the drive source. The drive wheel and the driven wheel are provided with engagement parts structured to transmit turning of the drive wheel to the driven wheel, the drive wheel is provided with a cam face forming part on which the engagement part of the driven wheel is slid at a rotational position where the engagement parts are not engaged with each other, and a brake member structured to generate a rotation load is disposed in a range on an upstream side of a power transmission path including the drive wheel with respect to the driven wheel in the power transmission path transmitting the power of the drive source.

22 Claims, 11 Drawing Sheets

(51) Int. Cl.
*F25D 17/06* (2006.01)
*E05F 5/00* (2017.01)
*F25D 17/04* (2006.01)

(52) U.S. Cl.
CPC ........ *F25D 17/062* (2013.01); *E05Y 2201/21* (2013.01); *E05Y 2201/266* (2013.01); *E05Y 2201/434* (2013.01); *E05Y 2201/638* (2013.01); *E05Y 2201/71* (2013.01); *E05Y 2201/712* (2013.01); *E05Y 2900/31* (2013.01); *F25D 2317/063* (2013.01); *F25D 2317/066* (2013.01)

(58) Field of Classification Search
CPC ........... E05Y 2201/638; E05Y 2900/31; E05Y 2201/434; E05Y 2201/266; E05Y 2201/712; E05Y 2201/71; F16H 25/16; F16H 371/122; F16H 25/18
USPC ........................ 74/70, 63, 64, 22 R; 399/227
See application file for complete search history.

(56) References Cited

U.S. PATENT DOCUMENTS

| | | | | | |
|---|---|---|---|---|---|
| 4,756,203 | A * | 7/1988 | Matsuda | F16H 35/02 | 74/84 R |
| 7,017,887 | B1 * | 3/2006 | Verakis | B66D 1/12 | 254/342 |
| 10,677,333 | B2 * | 6/2020 | Yokoe | F16H 25/16 | |
| 2005/0039553 | A1 * | 2/2005 | Chen | F16H 25/20 | 74/22 R |
| 2010/0139425 | A1 * | 6/2010 | Schulz | B60N 2/168 | 74/63 |
| 2010/0200338 | A1 * | 8/2010 | Laliche | B66B 5/027 | 187/263 |
| 2010/0320053 | A1 * | 12/2010 | Goeke | E05F 11/505 | 192/215 |
| 2014/0041468 | A1 * | 2/2014 | Yukitake | H02K 7/1085 | 74/63 |
| 2017/0097185 | A1 * | 4/2017 | Yasaka | F25D 23/028 | |
| 2020/0355010 | A1 * | 11/2020 | Aceto | E05F 15/649 | |

* cited by examiner

ROTATION TRANSMISSION MECHANISM AND DAMPER DEVICE

CROSS REFERENCE TO RELATED APPLICATION

The present invention claims priority under 35 U.S.C. § 119 to Japanese Application No. 2017-183715 filed Sep. 25, 2017, the entire content of which is incorporated herein by reference.

FIELD OF THE INVENTION

At least an embodiment of the present invention may relate to a rotation transmission mechanism structured to transmit rotation of a drive wheel to a driven wheel and a damper device.

BACKGROUND

A damper device which is used in a cold air passage of a refrigerator and the like is, for example, structured so that a baffle is driven by a baffle drive mechanism including a motor and a gear train to open and close an opening part formed in a frame. In Japanese Patent Laid-Open No. Hei 10-306970, this type of damper device is disclosed. In the damper device disclosed in the Patent Literature, a motor is rotated to drive a baffle in an open direction. Further, the motor is rotated in a reverse direction to drive the baffle in a closing direction.

In the damper device described in the Patent Literature, since a motor is rotated in both directions, a control circuit and a drive circuit become complicated and thus its cost is increased. Therefore, the present applicant has filed an application for a damper device which is structured to open and close a baffle based on rotation in one direction of a motor. For example, a damper device disclosed in Japanese Patent Application No. 2017-104121 includes, as a rotation transmission mechanism structured to transmit rotation of a motor to a baffle, a drive wheel in which drive teeth are formed in a stepped shape and a driven wheel in which driven teeth are formed in a stepped shape. The driven wheel is urged through a spring which urges the baffle to a closing direction, and the drive wheel is provided with a cam face on which the driven teeth are slid. Therefore, in a case that the baffle is to be opened, the driven teeth and the drive teeth respectively formed in stepped shapes are sequentially engaged with each other and turning of the drive wheel is transmitted to the driven wheel, and the baffle and the driven wheel are turned against an urging force of the spring. On the other hand, when the drive wheel is turned to a position where engagement of the drive teeth with the driven teeth is finished, after that, the driven teeth slide on a cam surface of the drive wheel and thus the driven wheel is turned in a direction where the baffle is closed by the urging force of the spring. Therefore, the baffle can be opened and closed by rotation in one direction of the motor.

In the rotation transmission mechanism disclosed in Japanese Patent Application No. 2017-104121, turning speed is varied when a plurality of the driven teeth is successively slid on the cam face. In this case, the turning speed of the driven wheel is varied when a driven tooth sliding on the cam face is switched. Further, the drive wheel is turned against the urging force of the spring which urges the driven wheel and thus, when a driven tooth contacting with the cam face is switched, turning of the drive wheel may be disturbed. For example, the drive wheel may be momentarily turned in a reverse direction. In addition, when this movement is transmitted from the drive wheel to an upstream side in a power transmission path of a drive force, noise may be generated. For example, in a case that a worm gear located at the most upstream side is attached so as to be wobbled in an axial direction, when a variation of turning of the drive wheel is transmitted, the worm gear is wobbled and moved in the axial direction and collides with a component on either side in the axial direction to generate a collision noise.

SUMMARY

In view of the problem described above, at least an embodiment of the present invention may advantageously provide a rotation transmission mechanism in which a drive wheel and a driven wheel are provided with a plurality of engagement parts and the driven wheel is urged by an urging member in a reverse direction to a drive direction by the drive wheel and, in the rotation transmission mechanism, noise caused by change of turning speed when a contact point between the drive wheel and the driven wheel is switched is reduced.

According to at least an embodiment of the present invention, there may be provided a rotation transmission mechanism structured to transmit power from a drive source, the rotation transmission mechanism including a plurality of rotation transmission members including a drive wheel and a driven wheel, and an urging member which urges the driven wheel in a reverse direction to a rotational direction by power of the drive source. The drive wheel and the driven wheel include engagement parts structured to transmit turning of the drive wheel to the driven wheel, the drive wheel is provided with a cam face forming part on which the engagement part of the driven wheel is slid at a rotational position where the engagement parts are not engaged with each other, and a brake member structured to generate a rotation load is disposed in a range on an upstream side of a power transmission path including the drive wheel with respect to the driven wheel in the power transmission path transmitting the power of the drive source.

According to at least an embodiment of the present invention, the drive wheel and the driven wheel are provided with engagement parts and the drive wheel is provided with a cam face forming part on which a portion of the engagement part of the driven wheel is slid. Therefore, turning is transmitted from the drive wheel to the driven wheel at a turning position where the engagement parts are engaged with each other. Further, the engagement part of the driven wheel is slid on the cam face forming part of the drive wheel at a turning position where the engagement is released and thus the driven wheel is turned in a reverse direction by an urging force of the urging member contrary to a case when turning is transmitted by the drive wheel. Therefore, the driven wheel can be reciprocatively turned by using a drive source which provides rotation of only one direction. Further, when the drive wheel and the driven wheel are used, disturbance of turning may be generated in the drive wheel when a contact point between the drive wheel and the driven wheel is switched. However, in at least an embodiment of the present invention, a brake member structured to generate a rotation load is disposed in a range on an upstream side of a power transmission path including the drive wheel with respect to the driven wheel. Therefore, disturbance of turning can be restrained from being transmitted to a side of the drive source on the way in the power transmission path. Accordingly, noise caused by disturbance of turning of the drive wheel can be restrained.

In at least an embodiment of the present invention, the drive source is a motor and, in a case that the plurality of the rotation transmission members includes a worm gear which is connected with an output shaft of the motor, the brake member is provided on a downstream side of the power transmission path with respect to the worm gear. According to this structure, disturbance of turning can be restrained from being transmitted to the worm gear. Therefore, noise caused by movement (wobbling) of the worm gear in the axial direction and collides with a component on either side in the axial direction (colliding noise of the worm gear) can be restrained. Further, a rotation torque of a rotation transmission member on an upstream side which is near to the worm gear is small and thus a required rotation load is small. Therefore, when the brake member is provided near the worm gear, the size of the brake member can be reduced.

In at least an embodiment of the present invention, in a case that the plurality of rotation transmission members includes a first gear engaging with the worm gear and a second gear disposed between the first gear and the drive wheel in the power transmission path, it is preferable that the brake member applies a rotation load to the second gear. According to this structure, a required rotation load is small in comparison with a case that a rotation load is applied to the drive wheel. Therefore, the size of the brake member can be reduced in comparison with a case that a rotation load is applied to the drive wheel.

In at least an embodiment of the present invention, the brake member is an elastic member. According to this structure, the rotation transmission member and the brake member can be easily contacted with each other to apply a rotation load. Further, rattling of the rotation transmission member can be eliminated.

In at least an embodiment of the present invention, the brake member is contacted with an end face on one side or the other side in a rotation axial direction of a loaded member to which the rotation load is applied among the plurality of the rotation transmission members. According to this structure, rattling in the rotation axial direction of the rotation transmission member can be eliminated. Further, in a case that the brake member is disposed on one side or the other side in the rotation axial direction of the rotation transmission member, a planar arrangement of the rotation transmission mechanism is not required to be changed. Therefore, design modification for adding the brake member can be reduced. Specifically, it may be structured that the elastic member is provided between an end face in a rotation axial direction of a loaded member to which the rotation load is applied among the plurality of the rotation transmission members and a rotation support part which supports rotation of the loaded member, and the elastic member is contacted with the loaded member to apply a brake force to the loaded member.

For example, it is preferable that the brake member is a spring washer. According to this structure, it is sufficient that a spring washer is attached simultaneously when the rotation transmission member is attached and thus the brake member can be easily assembled.

In at least an embodiment of the present invention, the cam face forming part is provided with a plurality of cam faces, and the engagement part of the driven wheel is sequentially slid on the plurality of the cam faces accompanied with turning of the drive wheel. According to this structure, even in a case that disturbance of turning of the drive wheel is generated when the cam face contacting with the driven wheel is sequentially switched, the disturbance of turning of the drive wheel is restrained from being transmitted to a side of the drive source.

In at least an embodiment of the present invention, each of the drive wheel and the driven wheel is provided with a plurality of the engagement parts, and the plurality of the engagement parts is formed at different positions in a rotation axial direction in each of the drive wheel and the driven wheel. According to this structure, the engagement parts are sequentially engaged with each other to drive the driven wheel and, after that, when the engagement of the drive wheel with the driven wheel is released, the driven wheel can be turned in a reverse direction by an urging force of the urging member while the engagement parts of the driven wheel are respectively slid on the cam faces corresponding to the engagement parts. Therefore, the driven wheel can be reciprocatively turned by using a drive source which rotates in only one direction.

In at least an embodiment of the present invention, the drive wheel is provided with a plurality of drive teeth which are provided in a stepped shape on an outer peripheral face of the drive wheel, the driven wheel is provided with a plurality of driven teeth which are provided in a stepped shape on an outer peripheral face of the driven wheel so as to be capable of sequentially engaging with the plurality of the drive teeth accompanied with turning of the drive wheel, and the engagement part is structured of a pair of the drive tooth and the driven tooth. Specifically, it may be structured that the engagement part of the drive wheel is provided with a plurality of drive teeth which are arranged in a stepped shape at positions different from each other in a rotation axial direction on an outer peripheral face of the drive wheel, the engagement part of the driven wheel is provided with a plurality of driven teeth which are arranged in a stepped shape at positions different from each other in a rotation axial direction on an outer peripheral face of the driven wheel so as to be capable of sequentially engaging with the plurality of the drive teeth accompanied with turning of the drive wheel, and the engagement part is structured of a pair of the drive tooth and the driven tooth. According to this structure, the drive teeth and the driven teeth are sequentially engaged with each other to drive the driven wheel and, after that, when the engagement of the drive tooth with the driven tooth is released, the driven wheel can be turned in a reverse direction by an urging force of the urging member. Therefore, the driven wheel can be reciprocatively turned by using a drive source which provides rotation in only one direction.

In at least an embodiment of the present invention, outer diameters of the plurality of the cam faces are reduced from one side to the other side in a circumferential direction, and the cam faces adjacent to each other in the circumferential direction are structured so that reducing rates in the circumferential direction of the outer diameters of the cam faces are different from each other. According to this structure, when the driven wheel is to be turned by the urging force of the urging member, turning speed of the driven wheel can be changed depending on sequentially switching of the driven tooth and its sliding cam face. Therefore, for example, the driven wheel is turned slowly at first and then the turning speed can be increased gradually. Further, even in a case that the speed is changed as described above, noise caused by disturbance of turning of the drive wheel when turning speed of the driven wheel is changed can be restrained.

In at least an embodiment of the present invention, the driven wheel is formed in a fan shape when viewed in a rotation axial direction of the driven wheel. In at least an embodiment of the present invention, it is sufficient that a portion of the driven wheel where the engagement parts are formed is reciprocatively turned with respect to the drive wheel and thus, when the driven wheel is formed in a fan shape, a useless portion can be eliminated. Therefore, the size of the driven wheel can be reduced and a space saving can be attained.

Next, according to at least an embodiment of the present invention, there may be provided a damper device including the rotation transmission mechanism described above, a frame formed with an opening part, a motor structured to drive the drive wheel, and a baffle to which turning of the driven wheel is transmitted to open and close the opening part. Since the rotation transmission mechanism in at least an embodiment of the present invention is used as described above, noise caused by switching the portion where the drive wheel and the driven wheel are contacted with each other can be restrained even in a case that turning speed when the baffle is to be closed is changed.

In at least an embodiment of the present invention, the motor is capable of rotating in only one direction. According to this structure, the opening part can be opened or closed by the baffle by using an inexpensive motor.

In at least an embodiment of the present invention, the urging member urges the baffle in an open direction or a closing direction with respect to the opening part and urges the driven wheel through the baffle. According to this structure, the urging member is not required to be assembled in the rotation transmission mechanism and thus the size of the rotation transmission mechanism can be reduced. Further, the urging member can be provided by utilizing an empty space around the baffle.

In at least an embodiment of the present invention, the damper device includes a case provided with rotation support parts which rotatably support the plurality of the rotation transmission members, and the brake member is disposed at least at one position between the case and the plurality of the rotation transmission members. According to this structure, the brake member can be attached when the rotation transmission members are assembled into the case.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A rotation transmission mechanism and a damper device for a refrigerator to which at least an embodiment of the present invention is applied will be described below with reference to the accompanying drawings. A damper device in accordance with at least an embodiment of the present invention is not limited to a damper device for a refrigerator and may be used in various apparatuses in which an intake port for a fluid is opened and closed to adjust its flow amount.

(Entire Structure)

Figure 1:
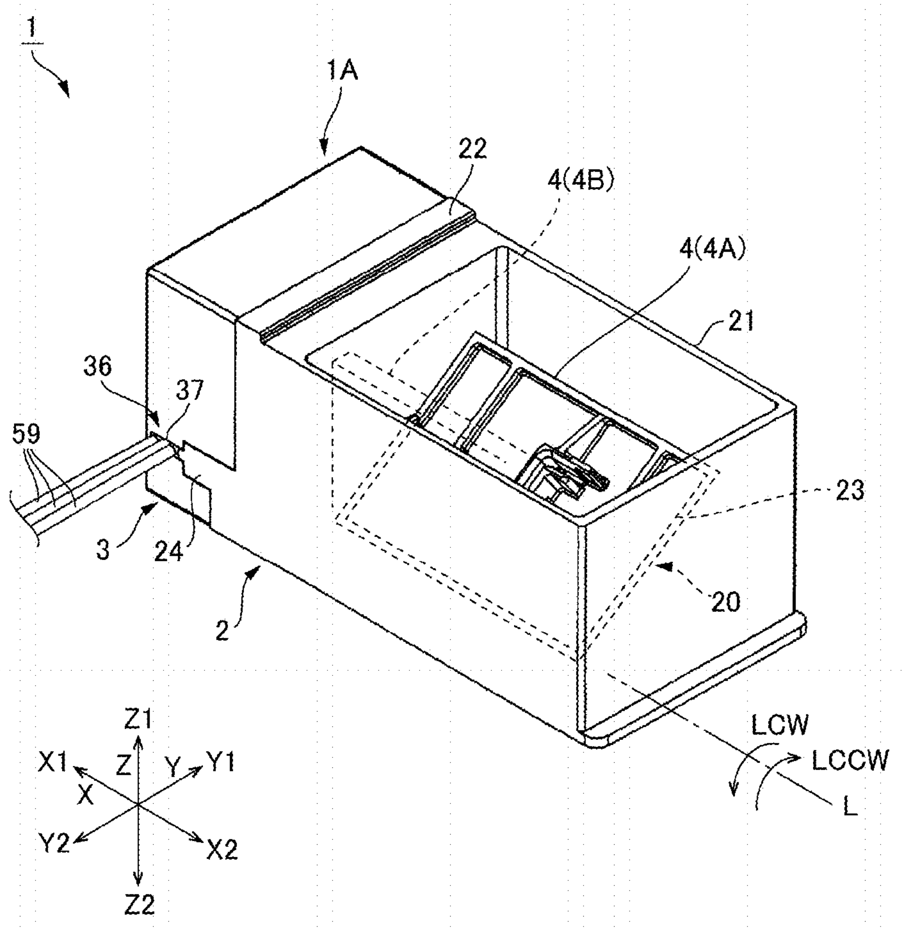
FIG. 1 is a perspective view showing a damper device in accordance with an embodiment of the present invention.
Figure 2:
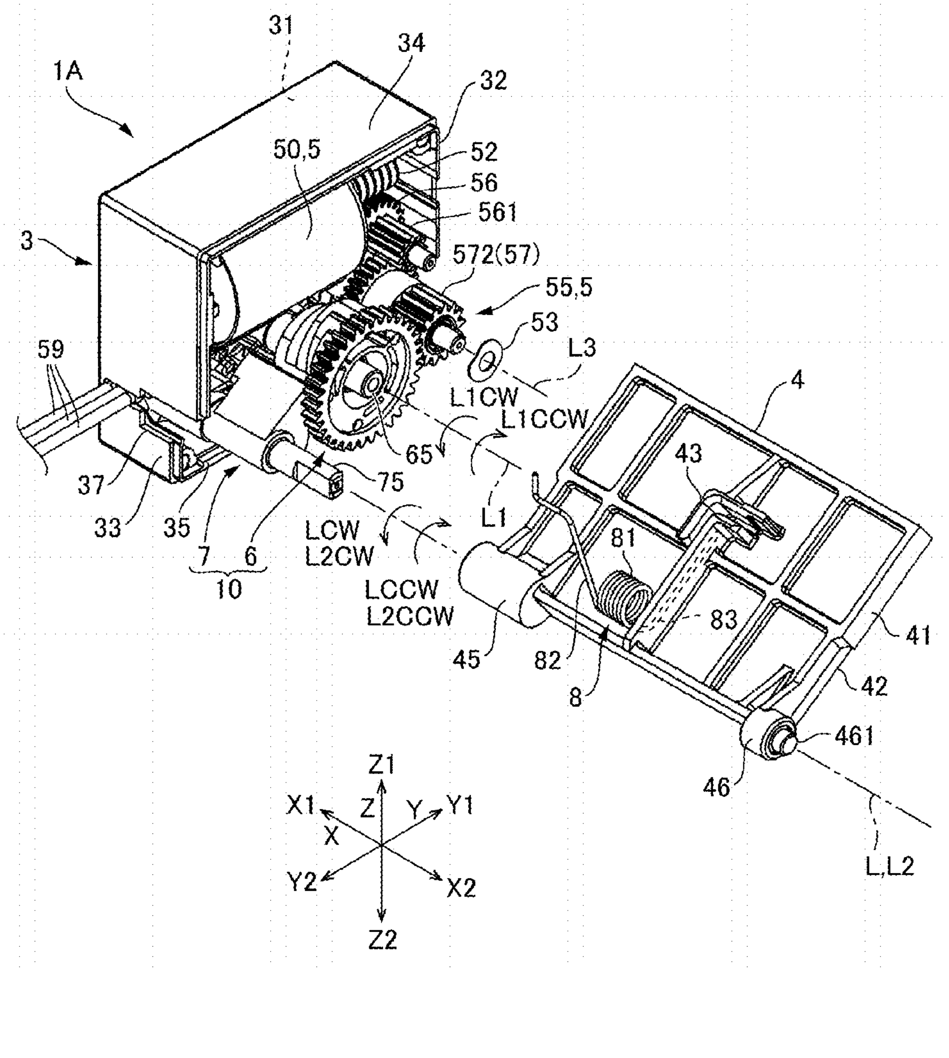
FIG. 2 is an exploded perspective view showing a damper device in which a frame is not shown.

FIG. 1 is a perspective view showing a damper device 1 in accordance with at least an embodiment of the present invention. FIG. 2 is an exploded perspective view showing the damper device 1 in which a frame 2 is not shown. In the present specification, the reference sign "L" is a turning center axial line of a baffle 4. Further, the first axial line "L1" is a rotation center axial line of a drive wheel 6 of a baffle drive mechanism 5 structured to drive the baffle 4, and the second axial line "L2" is a turning center axial line of a driven wheel 7. Further, a direction along the turning center axial line "L" is referred to as an "X" direction, a direction intersecting the turning center axial line "L" (direction in which cold air flows) is referred to as a "Z" direction, and a direction intersecting the "X" direction and the "Z" direction is referred to as a "Y" direction. Further, one side in the "X" direction is referred to as an "X1", the other side in the "X" direction is referred to as an "X2", one side in the "Y" direction is as a "Y1", the other side in the "Y" direction is as a "Y2", one side in the "Z" direction is as a "Z1", and the other side in the "Z" direction is as a "Z2".

As shown in FIG. 1 and FIG. 2, the damper device 1 is a rectangular parallelepiped shape which is long in the "X" direction as a whole. The damper device 1 includes a frame 2 in which a rectangular opening part 20 is formed, a baffle 4 for opening and closing the opening part 20, and a baffle drive mechanism 5 structured to drive the baffle 4. A cover 3 which accommodates the baffle drive mechanism 5 is attached to one end side in a longitudinal direction ("X" direction) of the frame 2. The frame 2 and the cover 3 are made of resin. The frame 2 is provided with a tube part 21 having a rectangular cross section which is opened to both sides in the "Z" direction. The frame 2 is integrally formed with a partition 22 which separates an inner side of the tube part 21 from a space where the baffle drive mechanism 5 is disposed on one side ("X1" direction side) in the longitudinal direction of the tube part 21. The cover 3 is engaged with the frame 2 by a hook mechanism not shown.

A frame-shaped seal part 23 is formed in the inner side of the tube part 21 so as to be obliquely inclined with respect to the "Z" direction and the "Y" direction. An inner side of the seal part 23 is formed to be the opening part 20. The baffle 4 is turnably supported by the frame 2 around the turning center axial line "L" extended in the "X" direction on the inner side of the tube part 21. In a state shown in FIG. 1, the baffle 4 is abutted with the seal part 23 and is set in a closing posture 4A that the opening part 20 is closed by the baffle 4. When the baffle drive mechanism 5 drives and turns the baffle 4 from this state to one side "LCW" around the turning center axial line "L" to separate the baffle 4 from the seal part 23, the baffle 4 is set to an open posture 4B in which the opening part 20 is opened.

In this embodiment, the baffle 4 includes an opening/closing plate 41 whose size is larger than the opening part 20 and a sheet-shaped elastic member 42 (see FIG. 2) made of foamed polyurethane or the like which is stuck on a face on the opening part 20 side of the opening/closing plate 41. The elastic member 42 is abutted with a periphery (seal part 23) of the opening part 20 to close the opening part 20. Cold air is flowed to one side "Z1" in the "Z" direction from an opposite side (the other side "Z2" in the "Z" direction) to the side where the baffle 4 is disposed (one side "Z1" in the "Z" direction) with respect to the opening part 20 through the opening part 20. Alternatively, cold air may be flowed from the side where the baffle 4 is disposed (one side "Z1" in the "Z" direction) with respect to the opening part 20 to the other side "Z2" in the "Z" direction through the opening part 20.

(Baffle Drive Mechanism)

Figure 3:
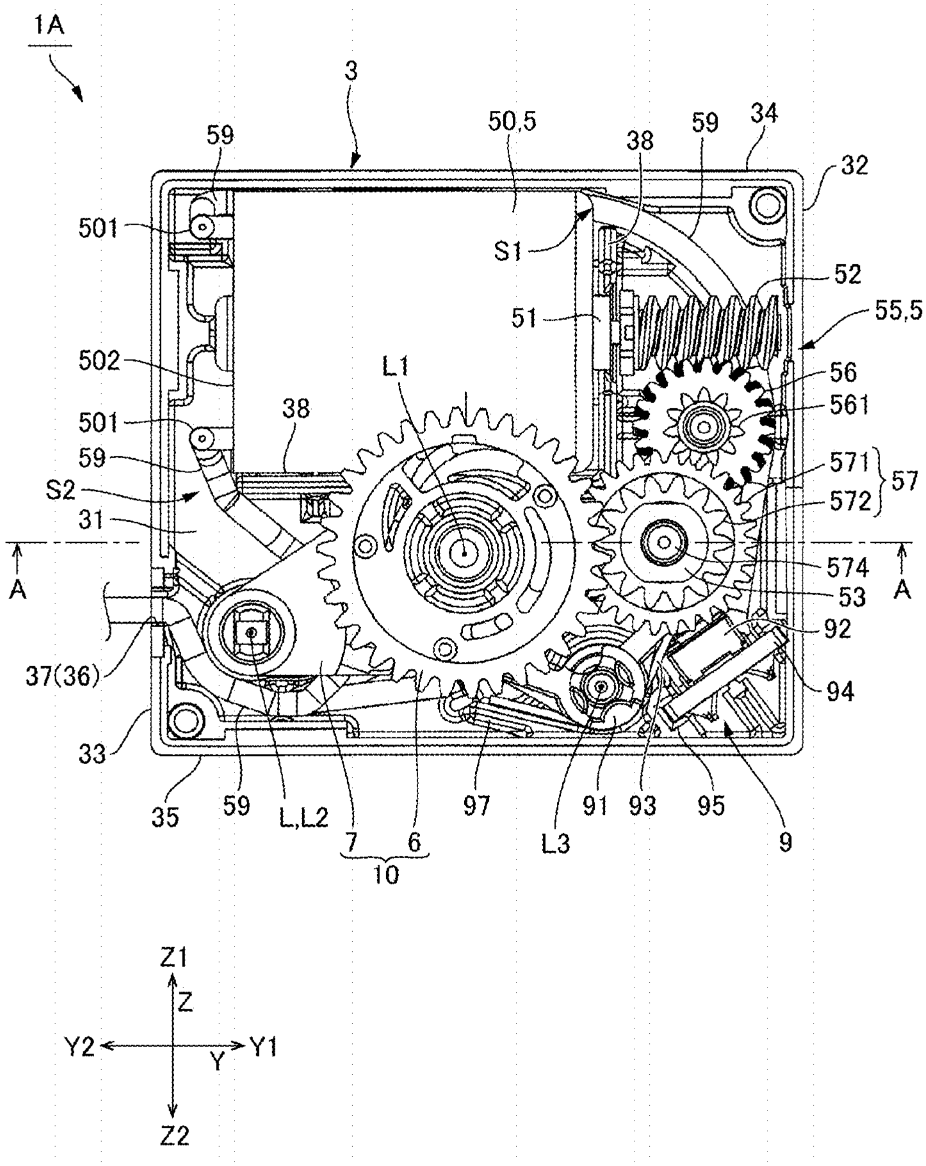
FIG. 3 is a plan view showing a cover and a baffle drive mechanism.

FIG. 3 is a plan view showing the cover 3 and the baffle drive mechanism 5. As shown in FIG. 2 and FIG. 3, the baffle drive mechanism 5 includes a motor 50 and a rotation transmission mechanism 55 structured to transmit rotation of the motor 50 to the baffle 4. The damper device 1 includes a geared motor 1A structured to turn the baffle 4, and the geared motor 1A accommodates the baffle drive mechanism 5 between the cover 3 and the partition 22 and is structured so as to be connected with lead wires 59. In other words, in this embodiment, the partition 22 of the frame 2 and the cover 3 structure a case which accommodates the baffle drive mechanism 5. The rotation transmission mechanism 55 includes a worm gear 52 formed on an output shaft 51 of the motor 50, a worm wheel 56 meshed with the worm gear 52, a composite gear 57 provided with a large diameter gear 571 which is meshed with a small diameter gear 561 formed in the worm wheel 56, and a downstream side rotation transmission mechanism 10 to which rotation of the composite gear 57 is transmitted through a small diameter gear 572 of the composite gear 57. Rotation of the downstream side rotation transmission mechanism 10 is transmitted to the baffle 4.

Various types of motor may be used as the motor 50. In this embodiment, a DC motor is used as the motor 50 and thus its control is easy. The motor 50 outputs rotation in only one direction around the motor axial line. In this embodiment, the motor 50 is rotated only in a direction for turning the baffle 4 to one side "LCW" (open direction) around the turning center axial line "L". In other words, the motor 50 outputs only a rotational drive force for driving a drive wheel 6 described below to one side "L1CCW" around the first axial line "L1".

As shown in FIG. 2 and FIG. 3, the downstream side rotation transmission mechanism 10 includes a drive wheel 6, which is rotated to one side "L1CCW" around the first axial line "L1" extended in the "X" direction in parallel to the turning center axial line "L" of the baffle 4, a driven wheel 7 which is driven and turned by the drive wheel 6 to one side "L2CW" around a second axial line "L2" parallel to the first axial line "L1", and an urging member 8 that is an urging member which urges the driven wheel 7 to the other side "L2CCW" around the second axial line "L2". Further, the downstream side rotation transmission mechanism 10 includes a position sensor 9 structured to monitor an angular position of the drive wheel 6 or the driven wheel 7 (baffle 4).

In this embodiment, the driven wheel 7 is connected with the baffle 4. Therefore, the turning center axial line of the driven wheel 7 (second axial line "L2") is coincided with the turning center axial line "L" of the baffle 4. In the downstream side rotation transmission mechanism 10, when the drive wheel 6 is turned to one side "L1CCW" around the first axial line "L1", the driven wheel 7 is turned to one side "L2CW" around the second axial line "L2" and the baffle 4 is turned to one side "LCW" around the turning center axial line "L" and thus the baffle 4 is set to the open posture 4B. On the other hand, even in a case that the drive wheel 6 is turned to one side "L1CCW" around the first axial line "L1", when turning drive for the driven wheel 7 by the drive wheel 6 is stopped, the driven wheel 7 is turned to the other side "L2CCW" around the second axial line "L2" by an urging force of the urging member 8. Therefore, the baffle 4 is turned to the other side "LCCW" around the turning center axial line "L" to be set in the closing posture 4A, and further turning of the baffle 4 to the other side "LCCW" around the turning center axial line "L" is prevented by a stopper or the like provided in the frame 2.

As shown in FIG. 1 and FIG. 2, the urging member 8 is disposed between the baffle 4 and the frame 2. The urging member 8 is a torsion coil spring, which is provided with a coil part 81 and end parts 82 and 83 in a straight line shape extended in different directions from both ends in an axial line direction of the coil part 81. One end part 82 of the urging member 8 is held by an engaging part (not shown) provided on an inner face of the tube part 21, and the other end part 83 is held by an engaging part 43 which is provided on a rear side (opposite side to the elastic member 42) of the opening/closing plate 41 of the baffle 4. The urging member 8 urges the baffle 4 to the other side "LCCW" (closing direction) around the turning center axial line "L" and thereby the driven wheel 7 is urged to the other side "L2CCW" around the second axial line "L2".

Figure 4:
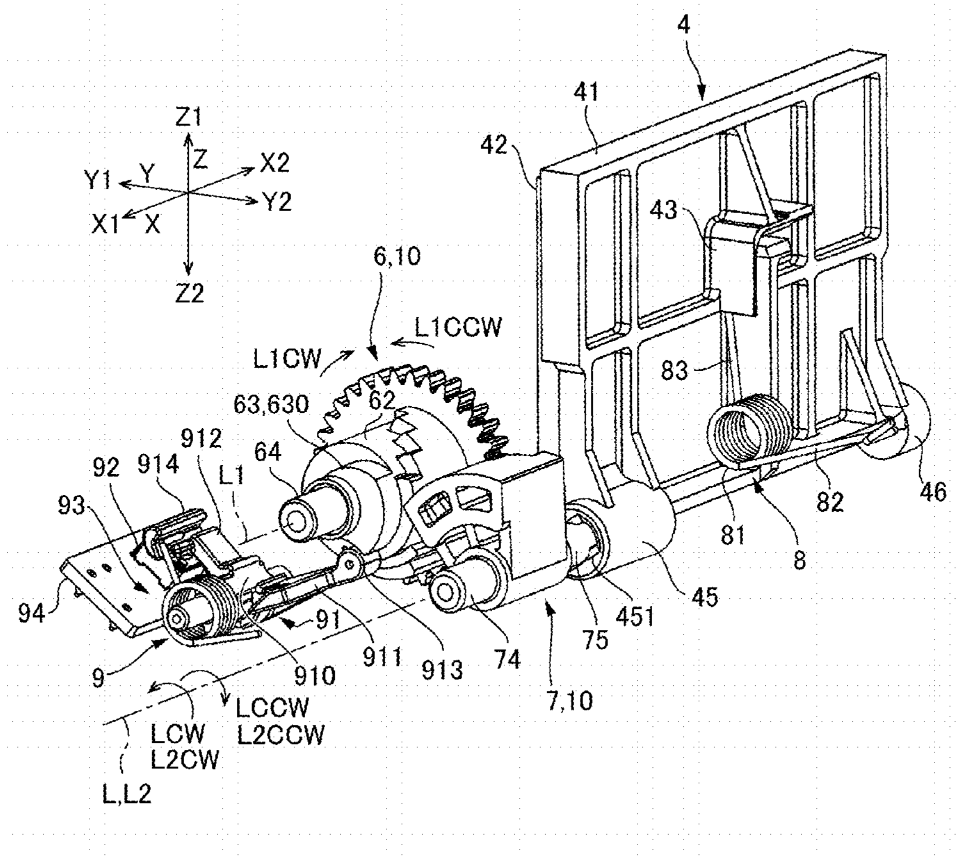
FIG. 4 is a perspective view showing a baffle, a rotation transmission mechanism and a position sensor.

FIG. 4 is a perspective view showing the baffle 4, the downstream side rotation transmission mechanism 10 and the position sensor 9. As shown in FIG. 2 and FIG. 4, the driven wheel 7 is provided with a shaft part 75 for connecting with the baffle 4. The shaft part 75 is protruded to an inner side of the tube part 21 through a penetration part which is penetrated through the partition 22 of the frame 2 and is connected with the baffle 4. Shaft parts 45 and 46 are formed at both end edges in the turning center axial line "L" direction of the baffle 4. The shaft part 75 is fitted to a fitting recessed part 451 (see FIG. 4) which is formed in the shaft part 45. A protruded part 461 in a columnar shape (see FIG. 2) is formed at a tip end of the shaft part 46. The protruded part 461 is turnably held by a holding hole (not shown) which is formed in the tube part 21 of the frame 2.

(Brake Member)

The rotation transmission mechanism 55 includes the worm gear 52, the worm wheel 56 (first gear), the composite gear 57 (second gear), the drive wheel 6 and the driven wheel 7 as a plurality of rotation transmission members which structure a power transmission path through which power of the motor 50 is transmitted to the baffle 4. Further, the rotation transmission mechanism 55 includes a brake member 53 which generates a rotation load in a rotation transmission member provided on an upstream side of the power transmission path with respect to the driven wheel 7. As shown in FIG. 2 and FIG. 3, in this embodiment, the brake member 53 is a spring washer which is disposed between the composite gear 57 and the partition 22 of the frame 2. The details of the brake member 53 will be described below.

(Drive Wheel and Driven Wheel)

Figure 5:
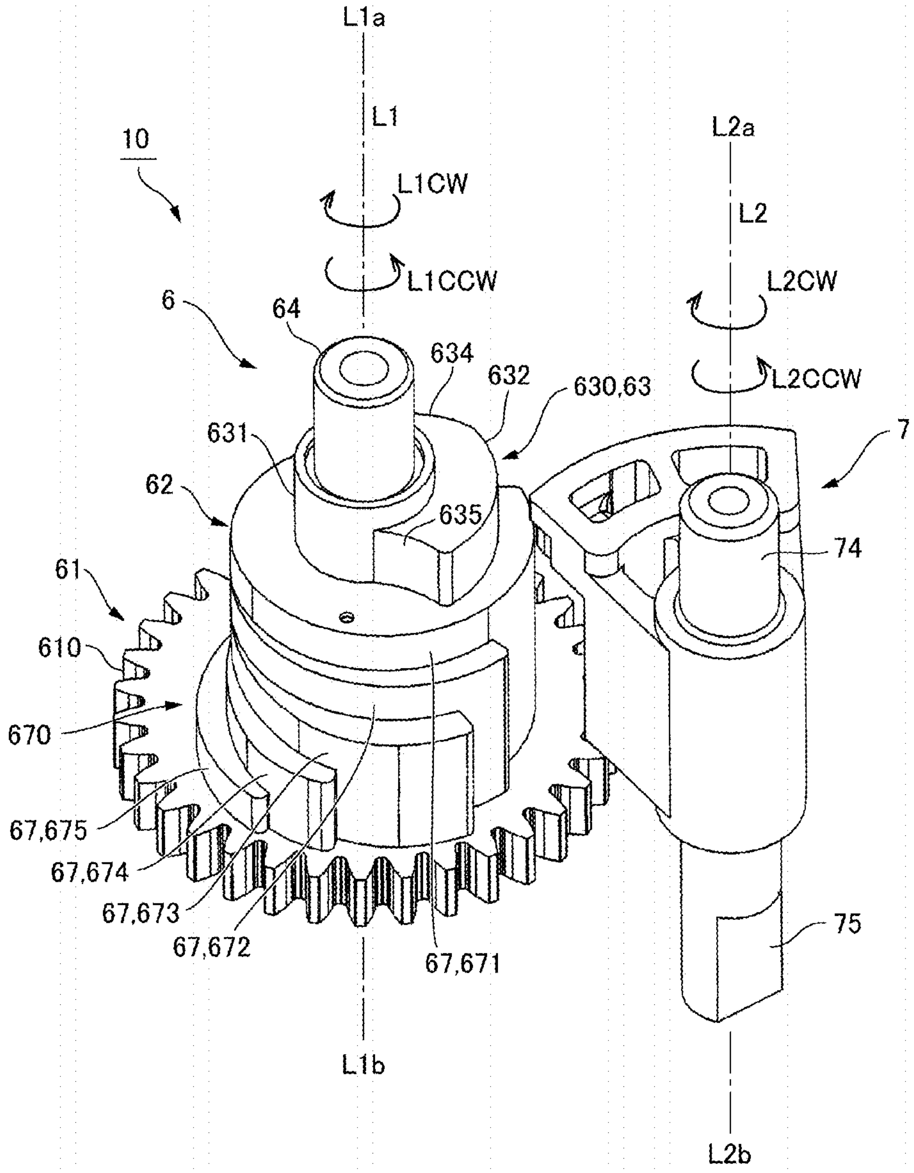
FIG. 5 is a perspective view showing a drive wheel and a driven wheel which are viewed from a side of a cam face forming part.
Figure 6:
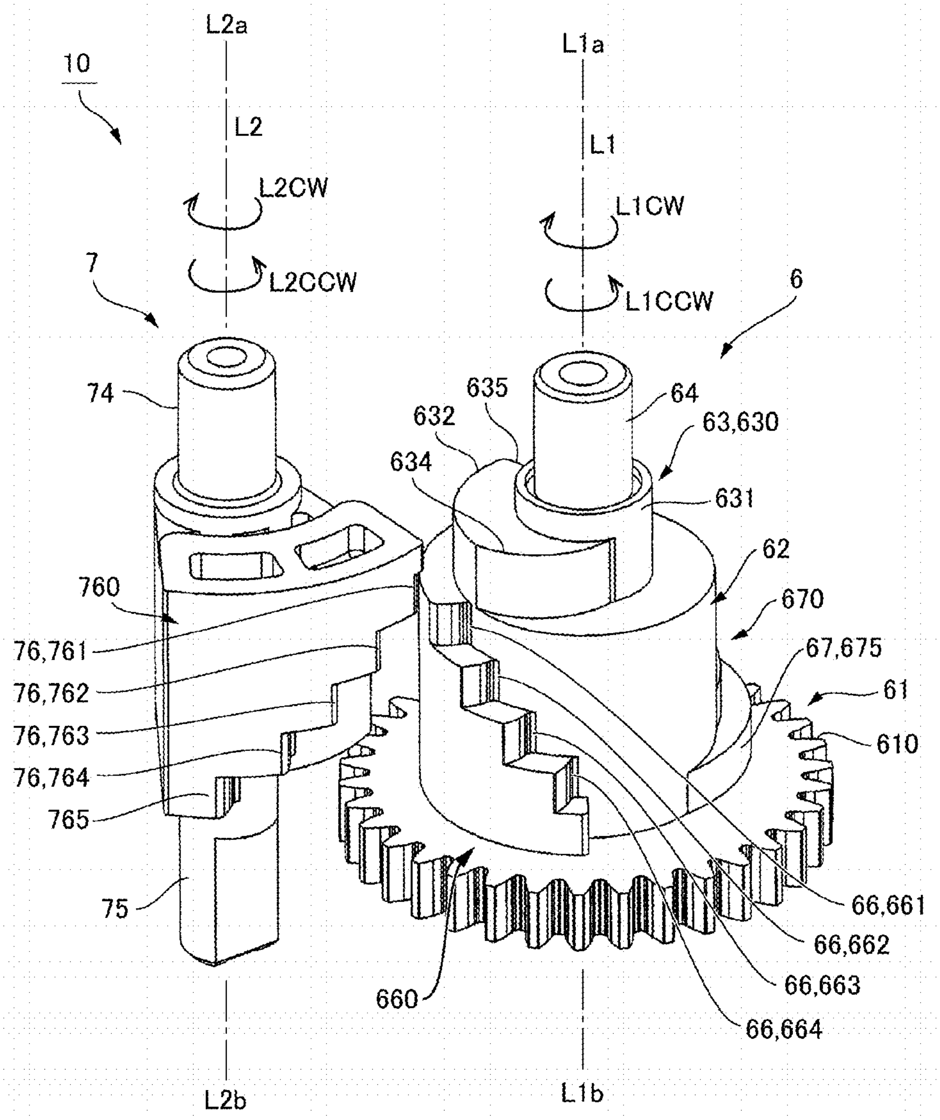
FIG. 6 is a perspective view showing a drive wheel and a driven wheel which are viewed from a side of drive teeth and driven teeth.
Figure 7A:
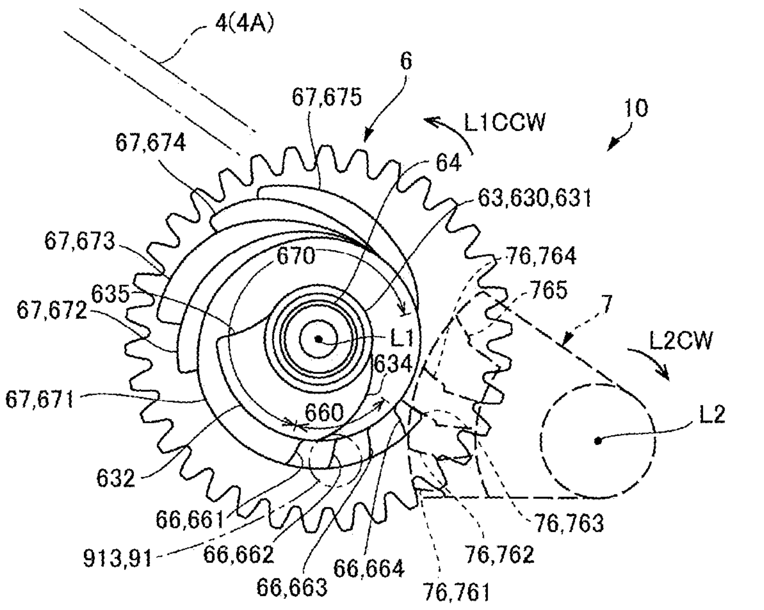
FIG. 7A and FIG. 7B are explanatory views showing a planar structure of a drive wheel and a driven wheel.
Figure 7B:
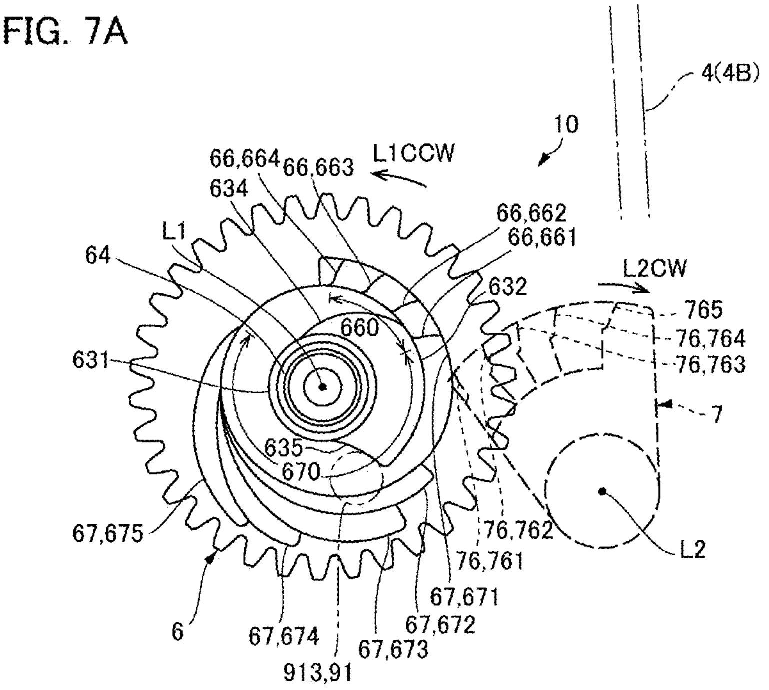

FIG. 5 is a perspective view showing the drive wheel 6 and the driven wheel 7 which are viewed from a side of a cam face forming part 670. FIG. 6 is a perspective view showing the drive wheel 6 and the driven wheel 7 which are viewed from a side of drive teeth 66 and driven teeth 76. Further, FIG. 7A and FIG. 7B are explanatory views showing a planar structure of the drive wheel 6 and the driven wheel 7. FIG. 7A shows a state that the baffle 4 is set in the closing posture 4A and FIG. 7B shows a state that the baffle 4 is set in the open posture 4B.

As shown in FIG. 5 and FIG. 6, the drive wheel 6 is provided with a circular plate part 61 whose outer peripheral face is formed with a gear 610, a first body part 62 in a columnar shape which is protruded from the center of the circular plate part 61 to one side "L1*a*" in the first axial line "L1" direction, a second body part 63 in a columnar shape which is protruded from the center of the first body part 62 to one side "L1*a*" of the first axial line "L1" direction, and a shaft part 64 in a columnar shape which is protruded from the center of the second body part 63 to one side "L1*a*" of the first axial line "L1" direction. Further, the drive wheel 6 is provided with a shaft part 65 (see FIG. 2 and FIG. 3) which is protruded from the center of the circular plate part 61 to the other side "L1*b*" in the first axial line "L1" direction. The shaft parts 64 and 65 are rotatably supported by the partition 22 of the frame 2. As shown in FIG. 2 and FIG. 3, the gear 610 formed in the drive wheel 6 is meshed with the small diameter gear 572 of the composite gear 57.

The drive wheel 6 is provided with a drive teeth forming part 660 where a plurality of drive teeth 66 structured to drive and turn the driven wheel 7 to one side "L2CW" around the second axial line "L2" is disposed in a circumferential direction, and a cam face forming part 670 on which the driven wheel 7 is slid when the driven wheel 7 is turned to the other side "L2CCW" around the second axial line "L2" by an urging force of the urging member 8. The drive teeth forming part 660 and the cam face forming part 670 are provided so as to be adjacent to each other in the circumferential direction.

On the other hand, the driven wheel 7 is provided with a driven teeth forming part 760 where a plurality of driven teeth 76 with which the drive teeth 66 are abutted in order when the drive wheel 6 is turned to one side "L1CCW" around the first axial line "L1" is disposed in the circumferential direction. In this embodiment, the driven wheel 7 is a sector gear and the driven teeth forming part 760 is structured by using its outer peripheral face. In the driven wheel 7, a shaft part 74 protruded to one side "L2*a*" in the second axial line "L2" direction and a shaft part 75 protruded to the other side "L2*b*" in the second axial line "L2" direction are formed at a center of the fan shape, and the shaft parts 74 and 75 are turnably supported by the partition 22 of the frame 2.

In the drive wheel 6, a plurality of drive teeth 66 is disposed at different positions in the first axial line "L1" direction and is formed in a multi-stage shape along the first axial line "L1" direction. A plurality of driven teeth 76 is provided at different positions in the second axial line "L2" direction so as to correspond to the structure of the drive wheel 6, and is formed in a multi-stage shape along the second axial line "L2" direction.

The downstream side rotation transmission mechanism 10 is structured so that, when the drive wheel 6 is turned to one side "L1CCW" around the first axial line "L1", the drive teeth 66 drive the driven wheel 7 to one side "L2CW" around the second axial line "L2" through the driven teeth 76 and, after that, when engagement of the drive teeth 66 with the driven teeth 76 is released, the driven wheel 7 is turned to the other side "L2CCW" around the second axial line "L2" by an urging force of the urging member 8. In this case, the driven wheel 7 is slid on the cam face forming part 670 provided in the drive wheel 6. Therefore, even in a case that the drive wheel 6 is turned to only one side "L1CCW" around the first axial line "L1", the driven wheel 7 can be turned to one side "L2CW" around the second axial line "L2" and, in addition, the driven wheel 7 can be turned to the other side "L2CCW" around the second axial line "L2".

(Drive Wheel)

As shown in FIG. 6, the drive wheel 6 is formed with totaled four (4) drive teeth 66 (first drive tooth 661, second drive tooth 662, third drive tooth 663 and fourth drive tooth 664) in a multi-stage shape along the first axial line "L1" direction. The four drive teeth 66 are respectively formed one by one at predetermined positions in the first axial line "L1" direction and, when viewed in the first axial line "L1" direction, the four drive teeth 66 are formed at equal angular intervals (see FIG. 7A and FIG. 7B).

In the four drive teeth 66, the first drive tooth 661 formed on the most one side "L1*a*" in the first axial line "L1" direction is disposed on the most other side "L1CW" around the first axial line "L1", and the second drive tooth 662, the third drive tooth 663 and the fourth drive tooth 664 are disposed in this order along one side "L1CCW" around the first axial line "L1" with respect to the first drive tooth 661. Therefore, among the four drive teeth 66, the fourth drive tooth 664 formed on the most other side "L1*b*" in the first axial line "L1" direction is located on the most one side "L1CCW" around the first axial line "L1". In other words, in this embodiment, the four drive teeth 66 are respectively formed so that the drive tooth 66 located on one side "L1*a*" in the first axial line "L1" direction is located on the other side "L1CW" around the first axial line "L1" with respect to the drive tooth 66 located on the other side "L1*b*" in the first axial line "L1" direction.

In this embodiment, the drive teeth 66 of the drive wheel 6 drive the driven wheel 7 only when the drive wheel 6 is turned to one side "L1CCW" around the first axial line "L1". Therefore, each of the four drive teeth 66 is, as shown in FIG. 7A and FIG. 7B, formed so that a face on one side "L1CCW" around the first axial line "L1" is provided with a tooth face having an involute curve, and that a face from an end part (tooth tip) on an outer side in a radial direction of each of the four drive teeth 66 to the other side "L1CW" around the first axial line "L1" is formed to be a circular peripheral face which is continuously extended from the end part on the outer side in the radial direction of each of the four drive teeth 66 (see FIG. 6).

In this embodiment, each of the faces on one side "L1CCW" around the first axial line "L1" of the second drive tooth 662, the third drive tooth 663 and the fourth drive tooth 664 of the four drive teeth 66 is formed to be a tooth face having a simple involute curve. On the other hand, the face of the first drive tooth 661 on one side "L1CCW" around the first axial line "L1" is formed so that a curvature radius of the end part on the outer side in the radial direction is increased with an involute curve as a basis. Therefore, when an operation described below is performed, a movement to the full open position from a position just before a full open state can be performed smoothly. Further, a direction to which a force is applied is not rapidly changed and thus momentary impact noise or the like can be reduced.

(Driven Wheel)

As shown in FIG. 6, the driven wheel 7 is formed with totaled four (4) driven teeth 76 (first driven tooth 761, second driven tooth 762, third driven tooth 763 and fourth driven tooth 764) in a multi-stage shape along the second axial line "L2" direction. The four driven teeth 76 (first driven tooth 761, second driven tooth 762, third driven tooth 763 and fourth driven tooth 764) are respectively formed at positions corresponding to the four drive teeth 66 (first drive tooth 661, second drive tooth 662, third drive tooth 663 and fourth drive tooth 664). The four driven teeth 76 are respectively formed one by one at predetermined positions in the second axial line "L2" direction and, when viewed in the second axial line "L2" direction, the four driven teeth 76 are formed at equal angular intervals (see FIG. 7A and FIG. 7B).

In the four driven teeth 76, the first driven tooth 761 formed on the most one side "L2*a*" in the second axial line "L2" direction is disposed on the most other side "L2CCW" around the second axial line "L2", and the second driven tooth 762, the third driven tooth 763 and the fourth driven tooth 764 are disposed in this order toward one side "L2CW" around the second axial line "L2" from the first driven tooth 761. Therefore, among the four driven teeth 76, the fourth driven tooth 764 formed on the most other side "L2*b*" in the second axial line "L2" direction is located on the most one side "L2CW" around the second axial line "L2". Accordingly, in the plurality of the driven teeth 76, the driven tooth 76 located on one side "L2*a*" in the second axial line "L2" direction is located on the other side "L2CCW" around the second axial line "L2" with respect to the driven tooth 76 located on the other side "L2*b*" in the second axial line "L2" direction.

In this embodiment, the drive teeth 66 are abutted with the driven teeth 76 only from the other side "L2CCW" around the second axial line "L2". Therefore, each of the four driven teeth 76 is formed so that a face on the other side "L2CCW" around the second axial line "L2" is provided with a tooth face having an involute curve, and that a portion from end parts (tooth tip) on an outer side in a radial direction of the four driven teeth 76 to one side "L2CW" around the second axial line "L2" is formed to be a circular peripheral face which is continuously extended from the end parts on the outer side in the radial direction of the four driven teeth 76 (see FIG. 6).

Further, the driven teeth forming part 760 of the driven wheel 7 is provided with a final driven tooth 765 on one side "L2CW" around the second axial line "L2" with respect to the plurality of the driven teeth 76 and on the other side "L2*b*" in the second axial line "L2" direction with respect to the plurality of the driven teeth 76 so as not to abut with the drive teeth 66 when the drive wheel 6 is turned to one side "L1CCW" around the first axial line "L1".

In this embodiment, respective pitches of the four driven teeth 76 (first driven tooth 761, second driven tooth 762, third driven tooth 763 and fourth driven tooth 764) are equal to each other. On the other hand, a pitch between the fourth driven tooth 764 and the final driven tooth 765 located on the most one side "L2CW" around the second axial line "L2" is wider than the pitch of the four driven teeth 76. For example, the pitch between the fourth driven tooth 764 and the final driven tooth 765 is set in a range from 1.1 times to 1.8 times of the pitch of the plurality of the driven teeth 76. In this embodiment, the pitch between the fourth driven tooth 764 and the final driven tooth 765 is set to 1.25 times of the pitch of the plurality of the driven teeth 76.

(Cam Face Forming Part)

The drive wheel 6 is structured with a cam face forming part 670 on a circular peripheral face formed on the other side "L1CW" around the first axial line "L1" with respect to the drive teeth forming part 660. The cam face forming part 670 is disposed at different positions in the first axial line "L1" direction with a plurality of cam faces 67 on which the driven teeth 76 are sequentially slid when the driven wheel 7 is turned to the other side "L2CCW" around the second axial line "L2" by an urging force of the urging member 8. The plurality of the cam faces 67 is formed in a multi-stage shape along the first axial line "L1" direction.

The cam face forming part 670 is formed with four cam faces 67 (first cam face 671, second cam face 672, third cam face 673 and fourth cam face 674) so as to correspond to the four driven teeth 76. Further, the cam face forming part 670 is provided with a final cam face 675 with which the final driven tooth 765 of the driven wheel 7 is abutted. Therefore, the cam face forming part 670 is formed with totaled five (5) cam faces 67.

In the five cam faces 67, the first cam face 671 formed on the most one side "L1*a*" in the first axial line "L1" direction is disposed on the most one side "L1CCW" around the first axial line "L1". The second cam face 672, the third cam face 673, the fourth cam face 674 and the final cam face 675 are disposed around the first axial line "L1" in this order along the other side "L1CW" with respect to the first cam face 671. Therefore, among the five cam faces 67, the final cam face 675 formed on the most other side "L1*b*" in the first axial line "L1" direction is located on the most other side "L1CW" around the first axial line "L1". Accordingly, in the plurality of the cam faces 67, the cam face 67 located on one side "L1*a*" in the first axial line "L1" direction is located on one side "L1CCW" around the first axial line "L1" with respect to the cam face 67 located on the other side "L1*b*" in the first axial line "L1" direction.

Each of the five cam faces 67 is formed of a circular arc face which is extended in a circular arc shape from one side "L1CCW" around the first axial line "L1" to the other side "L1CW" and the driven teeth 76 are slid on parts of the five cam faces 67 in the circumferential direction. Therefore, cam faces adjacent to each other in the circumferential direction of the five cam faces 67 are overlapped with each other over a certain angular range. In this embodiment, the first cam face 671 is extended in a circumferential direction from an end part on an outer side in a radial direction of the first drive tooth 661. Further, in each of the plurality of the cam faces 67, its end part on the most one side "L1CCW" around the first axial line "L1" is located on an outer side in the radial direction with respect to the adjacent cam face 67 on one side "L1CCW" around the first axial line "L1".

A diameter of each of the five cam faces 67 is reduced from one side "L1CCW" around the first axial line "L1" toward the other side "L1CW" and is reached to an outer peripheral face of the first body part 62 which is continuously extended from the tooth bottoms of the drive teeth 66 to the other side "L1CW" around the first axial line "L1". Further, in the final cam face 675, a reducing rate of an outer diameter in a circumferential direction of a portion located on one side "L1CCW" around the first axial line "L1" is smaller than that of other cam faces 67 (first cam face 671, second cam face 672, third cam face 673 and fourth cam face 674). In addition, a reducing rate of an outer diameter in the circumferential direction of a portion of the final cam face 675 located on the other side "L1CW" around the first axial line "L1" is larger than that of other cam faces 67. Further, in the second cam face 672, an end part on the most one side "L1CCW" around the first axial line "L1" is located on an inner side in the radial direction with respect to the cam faces 67 (third cam face 673, fourth cam face 674 and final cam face 675) provided on the other side "L1CW" around the first axial line "L1". Therefore, when an operation described below is to be performed, the third driven tooth 763, the fourth driven tooth 764 and the final driven tooth 765 which are disposed in a latter stage to the second driven tooth 762 are not interfered with a portion extended from the second cam face 672 to the other side "L1*b*" in the first axial line "L1" direction.

Further, in this embodiment, it is structured that, in respective regions where the plurality of the driven teeth 76 is sequentially slid on the plurality of the cam faces 67, the subsequent driven tooth 76 or the final driven tooth 765 for the next region is contacted with the cam face 67 while the driven tooth 76 in the current region has been contacted with the cam face.

(Position Sensor)

As shown in FIG. 4, the downstream side rotation transmission mechanism 10 in this embodiment includes a position sensor 9 structured to monitor an angular position of the drive wheel 6 or the driven wheel 7 (baffle 4). In this embodiment, the position sensor 9 is structured to monitor an angular position of the drive wheel 6. Further, the position sensor 9 is a pressing type switch mechanism.

The position sensor 9 includes a turnable lever 91 which is displaced by a sensor cam face 630 provided in the second body part 63 of the drive wheel 6, and a switch 92 whose state is switched by displacement of the turnable lever 91. The sensor cam face 630 is provided with a small diameter part 631, a diameter enlarging part 634, a large diameter part 632 and a diameter reducing part 635 along the other side "L1CW" around the first axial line "L1".

The switch 92 is, for example, a pressing type switch and is turned on/off by displacement of the turnable lever 91. The switch 92 may be another type of switch other than a pressing type switch. For example, a potentiometer may be used by which a variation amount such as displacement of the turnable lever 91 is detected as a variation of voltage. The turnable lever 91 is provided with a shaft part 910 which is turnably supported by a lever holding part formed in the cover 3, a first arm part 911 which is protruded from the shaft part 910 toward the sensor cam face 630 of the drive wheel 6, and a second arm part 912 which is protruded from the shaft part 910 toward the switch 92. A tip end of the first arm part 911 is provided with a first abutting part 913 in a circular shape which slides on the sensor cam face 630, and a tip end of the second arm part 912 is provided with a second abutting part 914 which is capable of abutting with the switch 92.

A torsion coil spring 93 which is an urging member supported by the cover 3 is provided for the turnable lever 91. One end part 931 of the torsion coil spring 93 is supported by a spring support wall 97 (see FIG. 10) formed in the cover 3, and the other end part 932 of the torsion coil spring 93 is supported by the second abutting part 914 which is provided at a tip end of the second arm part 912 of the turnable lever 91. Therefore, the second arm part 912 is urged toward the switch 92 by the torsion coil spring 93. Accordingly, in a region where the first abutting part 913 provided at the tip end of the first arm part 911 is abutted with the small diameter part 631 of the sensor cam face 630, the second abutting part 914 of the second arm part 912 presses the switch 92. On the other hand, in a region where the first abutting part 913 provided at the tip end of the first arm part 911 is abutted with the large diameter part 632 of the sensor cam face 630, the second abutting part 914 of the second arm part 912 is separated from the switch 92. Therefore, when an on/off state of the switch 92 is monitored, an angular position of the drive wheel 6 is detected and thus an angular position of the driven wheel 7 and the baffle 4 can be monitored.

The position sensor 9 is structured so that, as described below with reference to FIG. 8, after the driven wheel 7 is turned to the most one side "L2CW" around the second axial line "L2", an output from the switch 92 is switched at a midway position of a first region where the driven wheel 7 is stopped and, after the driven wheel 7 is turned to the most other side "L2CCW" around the second axial line "L2", the output from the switch 92 is switched at a midway position of a second region where the driven wheel 7 is stopped. Since the position sensor 9 is structured so that an output from the switch 92 is switched at a midway position of a region where the driven wheel 7 is stopped, even when a turning position of the drive wheel 6 is deviated to some extent due to a dimension error of a component or the like, an accurate angular position of the driven wheel 7 (baffle 4) can be detected. Therefore, malfunction of the baffle drive mechanism 5 can be restrained.

(Operation of Rotation Transmission Mechanism)

Figure 8:
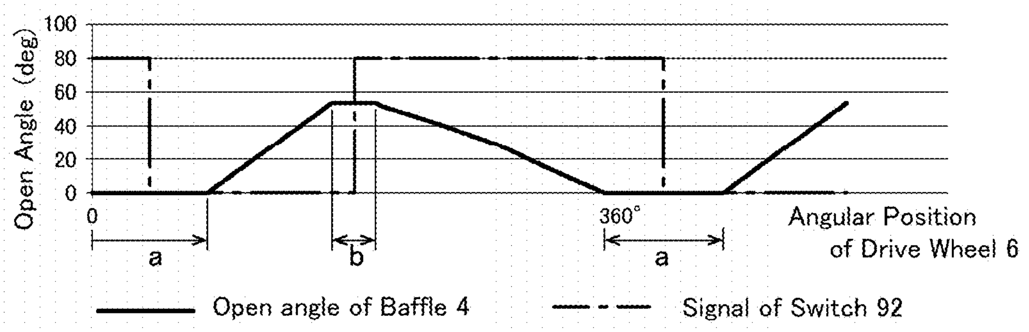
FIG. 8 is an explanatory view showing a relationship between an angular position of a drive wheel and an open angle of a baffle.

FIG. 8 is an explanatory view showing a relationship between an angular position of the drive wheel 6 and an open angle of the baffle 4. In FIG. 8, an open angle of the baffle 4 is indicated by a solid line and a change of an output from the switch 92 of the position sensor 9 is indicated by an alternate long and short dash line. An operation of the downstream side rotation transmission mechanism 10 will be described below with reference to FIG. 7A, FIG. 7B and FIG. 8. As shown in FIG. 7A, a state that the baffle 4 is set in a closing posture 4A is that, after the driven wheel 7 is turned to the most other side "L2CCW" around the second axial line "L2", the driven wheel 7 is stopped. In this state, the baffle 4 is urged to a closing direction (LCCW) by the urging member 8. However, the baffle 4 is not further turned to the closing direction (LCCW) by a stopper provided for the baffle or the like.

When the motor 50 is operated in a state shown in FIG. 7A, the drive wheel 6 is turned to one side "L1CCW" around the first axial line "L1". In a region until the fourth drive tooth 664 of the drive wheel 6 is abutted with the fourth driven tooth 764 of the driven wheel 7 (region "a" shown in FIG. 8), the driven wheel 7 and the baffle 4 are in a stationary state. Further, in a region where the first abutting part 913 of the turnable lever 91 is abutted with the large diameter part 632 of the sensor cam face 630, the position sensor 9 is set in a state that an output from the switch 92 is off.

When the fourth drive tooth 664 of the drive wheel 6 is abutted with the fourth driven tooth 764 of the driven wheel 7, the driven wheel 7 begins to turn to one side "L2CW" around the second axial line "L2" against an urging force of the urging member 8. As a result, the baffle 4 begins to turn to one side "LCW" (open direction) around the turning center axial line "L". When the drive wheel 6 is further turned, the driven wheel 7 is also further turned and the third drive tooth 663 is abutted with the third driven tooth 763 of the driven wheel 7. Subsequently, the second drive tooth 662 is abutted with the second driven tooth 762 of the driven wheel 7 and then, the first drive tooth 661 is abutted with the first driven tooth 761 of the driven wheel 7 and, after that, the driven wheel 7 is turned until a tooth tip of the first drive tooth 661 rides on a tooth tip of the first driven tooth 761 of the driven wheel 7. As a result, the baffle 4 is set in an open posture 4B.

Next, when the drive wheel 6 is further turned to one side "L1CCW" around the first axial line "L1", engagement of the first drive tooth 661 of the drive wheel 6 with the first driven tooth 761 of the driven wheel 7 is released and thus the driven wheel 7 is going to turn to the other side "L2CCW" around the second axial line "L2" by an urging force of the urging member 8. However, the first driven tooth 761 is abutted with the first cam face 671 and thus the driven wheel 7 is prevented from being turned to the other side "L2CCW" around the second axial line "L2". Therefore, a state is maintained that the driven wheel 7 is stopped on the most one side "L2CW" around the second axial line "L2" (region "b" shown in FIG. 8). Accordingly, the baffle 4 is also stopped in an open posture 4B and the first driven tooth 761 slides on the first cam face 671.

FIG. 7B shows a midway state that the first driven tooth 761 is sliding on the first cam face 671. The driven wheel 7 and the baffle 4 are maintained in a stopped state in an open posture 4B until the first driven tooth 761 is reached to a portion where a diameter of the first cam face 671 is reduced on the other side "L1CW" around the first axial line "L1" of the first cam face 671. Further, in the position sensor 9, the first abutting part 913 of the turnable lever 91 is moved from the large diameter part 632 of the sensor cam face 630 to the small diameter part 631 through the diameter reducing part 635 at a midway position of the stop region (region "b" shown in FIG. 8). Therefore, an output from the switch 92 is turned from "off" to "on". FIG. 7B shows a midway state that the first abutting part 913 of the turnable lever 91 is moving to the small diameter part 631 of the sensor cam face 630.

When the first driven tooth 761 is reached to a portion where a diameter of the first cam face 671 is reduced on the other side "L1CW" around the first axial line "L1" of the first cam face 671, the driven wheel 7 begins to turn to the other side "L2CCW" around the second axial line "L2" by an urging force of the urging member 8. Therefore, the baffle 4 begins to turn to the other side "LCCW" (closing direction) around the turning center axial line "L".

When the drive wheel 6 is further turned to one side "L1CCW" around the first axial line "L1", the second driven tooth 762 is contacted with the second cam face 672 in a state that the first driven tooth 761 is contacted with the first cam face 671. Then, the second driven tooth 762 slides on the second cam face 672. Subsequently, the first driven tooth 761 is separated from the first cam face 671 and, in a state that the second driven tooth 762 is contacted with the second cam face 672, the third driven tooth 763 is contacted with the third cam face 673 and the third driven tooth 763 slides on the third cam face 673. Then, the second driven tooth 762 is separated from the second cam face 672 and, in a state that the third driven tooth 763 is contacted with the third cam face 673, the fourth driven tooth 764 is contacted with the fourth cam face 674 and the fourth driven tooth 764 slides on the fourth cam face 674. In addition, the third driven tooth 763 is separated from the third cam face 673 and, in a state that the fourth driven tooth 764 is contacted with the fourth cam face 674, the final driven tooth 765 is contacted with the final cam face 675 and the final driven tooth 765 slides on the final cam face 675.

The driven wheel 7 is turned to the other side "L2CCW" around the second axial line "L2" by an urging force of the urging member 8 until the final driven tooth 765 is separated from the final cam face 675 and, after that, the driven wheel 7 is stopped. Therefore, the baffle 4 is stopped in a state of the closing posture 4A. Meanwhile, even when the first drive wheel 6 is further turned to one side "L1CCW" around the axial line "L1", the driven wheel 7 and the baffle 4 are maintained in a stopped state (region "a" shown in FIG. 8) until the fourth drive tooth 664 is abutted with the fourth driven tooth 764. Further, at a midway position of the stopped region, the first abutting part 913 of the turnable lever 91 which is used in the position sensor 9 is moved from the small diameter part 631 of the sensor cam face 630 to the large diameter part 632 through the diameter enlarging part 634. Therefore, an output from the switch 92 is turned from "on" to "off".

After that, when the drive wheel 6 is further turned to one side "L1CCW" around the first axial line "L1", the above-mentioned operation is repeated.

(Restraining Noise by Brake Member)

The drive wheel 6 in this embodiment is turned against an urging force of the urging member 8 which urges the driven wheel 7. Therefore, when the driven tooth 76 contacting with the cam face 67 of the drive wheel 6 is switched, the drive wheel 6 tends to be momentarily turned in a reverse direction. In this embodiment, in order to restrain that disturbance of turning (rotation) of the drive wheel 6 is transmitted to the worm gear 52 disposed on the most upstream side of the power transmission path for transmitting power of the motor 50 to cause generation of noise, a rotation load is applied by a brake member 53 on the way of the power transmission path. A region where the brake member 53 is to be disposed is that from the drive wheel 6 to the worm wheel 56 (first gear). In this embodiment, a rotation load is applied to the composite gear 57 (second gear). In other words, in this embodiment, the composite gear 57 is a load applied member. Further, a rotation load (brake force) applied by the brake member 53 is set in a magnitude which is capable of preventing the drive wheel 6 from being turned in a reverse direction.

Figure 9:
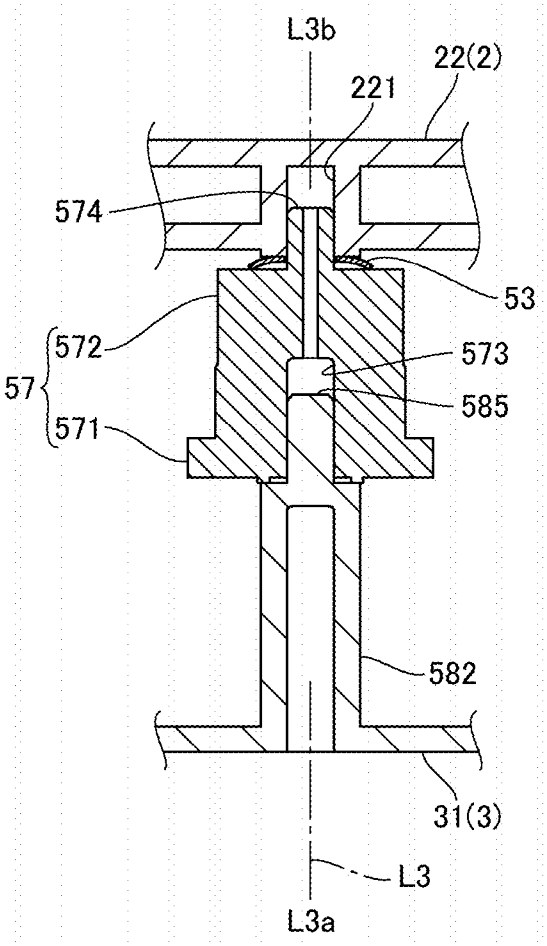
FIG. 9 is an explanatory view showing an attaching structure of a brake member.

FIG. 9 is an explanatory view showing an attaching structure of a brake member 53 and is a partial cross-sectional view at the "A-A" position in FIG. 3. The rotation transmission mechanism 55 is assembled between the frame 2 and the cover 3, and a plurality of rotation support parts supporting the rotation transmission mechanism 55 is provided in a bottom part 31 of the cover 3 facing the partition 22 of the frame 2. In other words, the bottom part 31 of the cover 3 is provided with a first rotation support part 581 supporting the worm wheel 56, a second rotation support part 582 supporting the composite gear 57, a third rotation support part 583 supporting the drive wheel 6, and a fourth rotation support part 584 supporting the driven wheel 7 (see FIG. 10). Further, the partition 22 (case) facing the bottom part 31 of the cover 3 is provided with rotation support parts such as a shaft hole which face the above-mentioned four rotation support parts.

As shown in FIG. 9, the composite gear 57 is rotatably supported with the third axial line "L3" (rotation axis) parallel to the first axial line "L1" and the second axial line "L2" as a center. The composite gear 57 is formed with a shaft hole 573 at a center of an end face on one side "L3*a*" (side of the cover 3) in the third axial line "L3" direction and a protruded part 574 at a center of an end face on the other side "L3*b*" (side of the partition 22) in the third axial line "L3" direction. A shaft part 585 which is protruded from a center of a tip end of the second rotation support part 582 is inserted into the shaft hole 573, and the protruded part 574 is inserted into a shaft hole 221 (rotation support part) formed in the partition 22 of the frame 2. In this manner, the composite gear 57 is rotatably supported around the third axial line "L3".

The brake member 53 is a spring washer, which is capable of being elastically deformed in the third axial line "L3" direction. As shown in FIG. 2 and FIG. 3, the spring washer in this embodiment is manufactured by bending a metal plate and is formed in a shape whose one side and the other side in a radial direction of a ring-shaped metal plate are bent to the same direction. The brake member 53 is disposed in a compressed state between an end face of the composite gear 57 on the other side "L3*b*" in the third axial line "L3" direction and the partition 22 of the frame 2 where the shaft hole 221 that is a rotation support part for the composite gear 57 is provided. Therefore, when the composite gear 57 is rotated, the brake member 53 is slidably contacted with the partition 22 and the composite gear 57 and thus a brake force that is a rotation load is applied to the composite gear 57. Further, the composite gear 57 is positioned by an urging force of the brake member 53 so that its end face on one side "L3*a*" in the third axial line "L3" direction is abutted with an end face of the second rotation support part 582 in the third axial line "L3" direction.

(Wiring of Lead Wire)

In this embodiment, when the baffle drive mechanism 5 is to be assembled between the frame 2 and the cover 3 (case), first, as shown in FIG. 2 and FIG. 3, the baffle drive mechanism 5 is assembled to an inner side of the cover 3 and, after that, the frame 2 and the cover 3 are engaged and fixed to each other. The cover 3 is provided with a rectangular bottom part 31, a first wall 32 which is stood up from an edge on one side "Y1" in the "Y" direction of the bottom part 31, a second wall 33 which is stood up from an edge on the other side "Y2", a third wall 34 which is stood up from an edge on one side "Z1" in the "Z" direction of the bottom part 31, and a fourth wall 35 which is stood up from an edge on the other side "Z2".

As shown in FIG. 1, a wiring outlet 36 for extending lead wires 59 outside from an inner side of the cover 3 is formed between the frame 2 and the cover 3. The lead wires 59 are held between the cover 3 and the frame 2 in the wiring outlet 36. The wiring outlet 36 is formed between a cut-out part 37 formed by cutting the second wall 33 of the cover 3 to one side "X1" in the "X" direction and a tip end of a protruded part 24 which is protruded from the frame 2 to the cut-out part 37 and is fitted to an opening part of the cut-out part 37. Three lead wires 59 are passed through the wiring outlet 36, and one of them is connected to the motor 50. Other two lead wires are connected to the position sensor 9.

Figure 10:
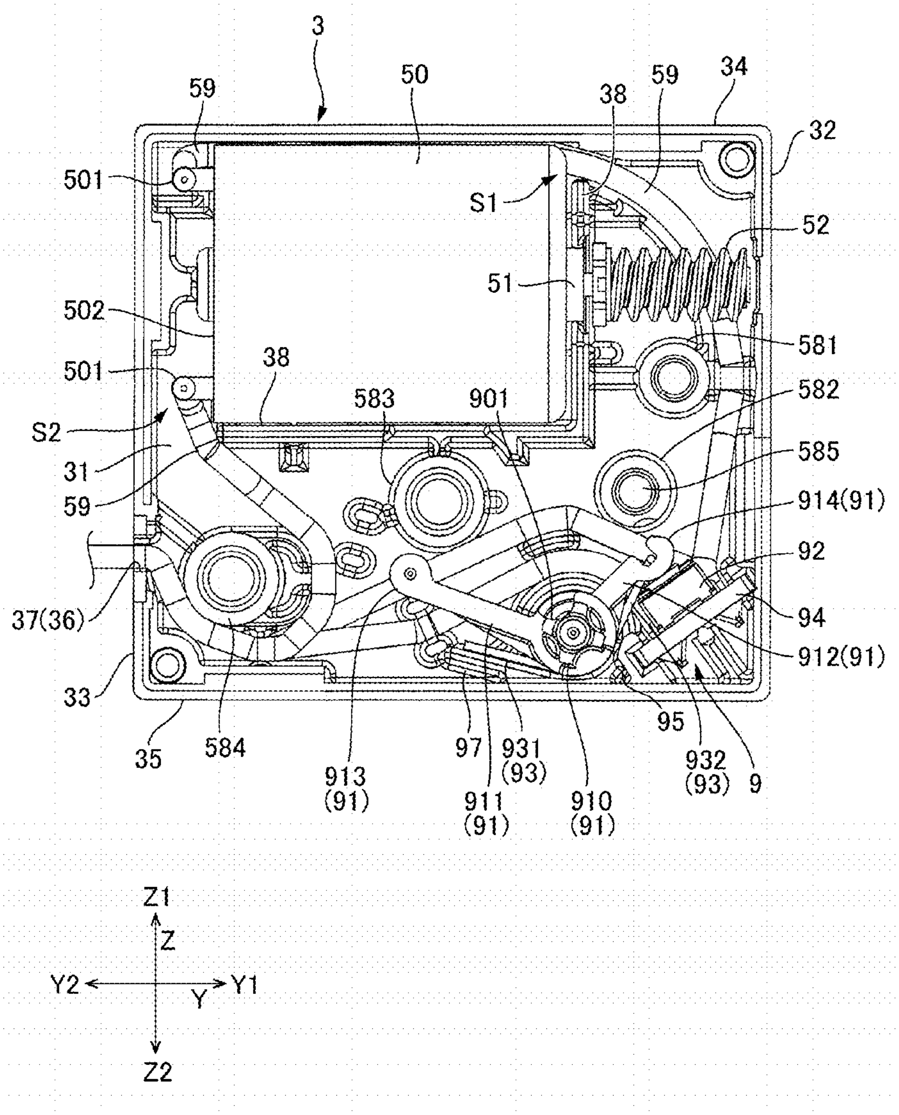
FIG. 10 is a plan view showing a cover, lead wires, a position sensor, a motor and a worm gear.

FIG. 10 is a plan view showing the cover 3, the lead wires 59, the position sensor 9, the motor 50 and the worm gear 52. The motor 50 is disposed so that a longitudinal direction ("Y" direction) of the cover 3 and a motor axial line direction are coincided with each other, and the motor 50 is disposed at a corner part where the second wall 33 and the third wall 34 of the cover 3 intersect each other. The bottom part 31 of the cover 3 is formed with a partition wall 38 so as to surround the motor 50. A space between the partition wall 38 and the first wall 32 and the fourth wall 35 of the cover 3 is formed to be a space for disposing the rotation transmission mechanism 55 and the position sensor 9. The worm gear 52 which is attached to the output shaft 51 of the motor 50 is protruded between the partition wall 38 and the first wall 32. Motor terminals 501 with which the lead wires 59 are connected are provided in a motor rear end face 502 which faces the second wall 33 of the cover 3 on an opposite side to the worm gear 52 in the motor axial line direction.

The position sensor 9 is disposed in a corner part where the first wall 32 and the fourth wall 35 are connected with each other. The position sensor 9 is a switch mechanism including a pressing type switch 92. The switch 92 is mounted on a switch circuit board 94 which is held by the cover 3. A circuit board holding part 95 provided with a holding groove for holding the switch circuit board 94 is formed in the corner part where the first wall 32 and the fourth wall 35 of the cover 3 are connected with each other. The switch circuit board 94 is disposed so that its face on which the switch 92 is fixed faces in the diagonal direction of the cover 3. Two lead wires 59 passing through the wiring outlet 36 are connected with the switch circuit board 94. Further, one lead wire 59 is extended from the switch circuit board 94 to the motor 50.

The bottom part 31 of the cover 3 is formed with the rotation support part which supports a gear structuring the transmission mechanism 55 at four positions. The first rotation support part 581 which supports the worm wheel 56 is disposed between the partition wall 38 and the first wall 32. The second rotation support part 582 which supports the composite gear 57 is disposed between the first rotation support part 581 and the position sensor 9. Further, the third rotation support part 583 which supports the drive wheel 6 and the fourth rotation support part 584 which supports the driven wheel 7 are disposed in this order between the second rotation support part 582 and the second wall 33.

As shown in FIG. 10, three lead wires 59 are passed through a space between the fourth rotation support part 584 and the fourth wall 35 from the wiring outlet 36 formed in the second wall 33. One of the lead wires 59 is wound around an outer periphery of the fourth rotation support part 584 and is extended to the space "S2" between the partition wall 38 and the second wall 33 and then, the lead wire 59 is extended from the space "S2" to the motor rear end face 502 and is connected with the motor terminal 501. Since the partition wall 38 is not connected with the second wall 33, the space "S2" is existed between an end part of the partition wall 38 and the second wall 33 and the space "S2" serves as a holding part of the lead wire 59. When the lead wire 59 is passed through the space "S2" between the partition wall 38 and the second wall 33, a contact angle of the lead wire 59 with an outer peripheral edge of the motor rear end face 502 is restricted by the partition wall 38. Therefore, disconnection of the lead wire 59 by an edge of the outer peripheral edge of the motor rear end face 502 is restrained.

Two other lead wires 59 of the three lead wires 59 passed through a space between the fourth rotation support part 584 and the fourth wall 35 from the wiring outlet 36 are passed through a space between the third rotation support part 583 and the turnable lever 91 of the position sensor 9 and are connected with the switch circuit board 94 of the position sensor 9. The lead wire 59 connecting the switch circuit board 94 with the motor 50 is extended from the switch circuit board 94 along the first wall 32 and is held between the first wall 32 and the first rotation support part 581 to be led to the gap space "S1" between the partition wall 38 and the third wall 34. Then, the lead wire 59 is extended to the motor rear end face 502 along the third wall 34 and is connected with the motor terminal 501.

As shown in FIG. 10, the motor 50 is attached so as to cover a portion of the lead wire 59 connecting the switch circuit board 94 with the motor 50 extended along the third wall 34. In other words, in this embodiment, a wiring space for the lead wire 59 extended from an output shaft 51 side of the motor 50 to the motor rear end face 502 side is provided between the motor 50 and the bottom part 31 of the cover 3. Therefore, when the lead wire 59 is to be extended from the output shaft 51 side to the motor rear end face 502, the lead wire 59 is not required to be passed over the motor 50. Therefore, when the frame 2 is to be fixed to the cover 3 into which the baffle drive mechanism 5 has been assembled, the lead wire 59 is prevented from being bitten and crushed between the cover 3 and the frame 2.

(Principal Effects in this Embodiment)

As described above, the damper device 1 in this embodiment includes the rotation transmission mechanism 55 structured to transmit power (rotation) from the motor 50 that is a drive source to the baffle 4, and the rotation transmission mechanism 55 includes the drive wheel 6 and the driven wheel 7 which structure a downstream side portion of the power transmission path and which are provided with a plurality of engagement parts (drive tooth 66 and driven tooth 76). In addition, the drive wheel 6 is provided with the cam face 67 on which the driven tooth 76 (portion on the driven wheel 7 side of the engagement parts) is capable of sliding. Therefore, rotation (turning) is transmitted from the drive wheel 6 to the driven wheel 7 at a turning position where the engagement parts (drive tooth 66 and driven tooth 76) are engaged with each other. Further, at a turning position where the engagement is released, the driven tooth 76 is slid on the cam face 67 and thus the driven wheel 7 is turned by an urging force of the urging member 8 in a reverse direction to the turning direction by power of the motor 50. Therefore, the driven wheel 7 can be reciprocatively turned by using the motor 50 which supplies rotation in only one direction. Further, conventionally, in the drive wheel 6 and the driven wheel 7 structured as described above, when the portion where the drive wheel 6 and the driven wheel 7 are contacted with each other is switched, turning of the drive wheel 6 may be disturbed. However, according to this embodiment, the brake member 53 generating a rotation load is disposed in a region including the drive wheel 6 on an upstream side with respect to the driven wheel 7 in the power transmission path. Therefore, disturbance of turning (rotation) can be restrained from transmitting to the motor 50 side on the way in the power transmission path and thus noise caused by disturbance of turning (rotation) of the drive wheel 6 can be restrained.

In this embodiment, the drive source is a motor and the rotation transmission mechanism 55 includes the worm gear 52 connected with the output shaft 51 of the motor 50 and thus the brake member 53 is provided on a downstream side of the power transmission path with respect to the worm gear 52. As a result, disturbance of rotation is restrained from being transmitted to the worm gear 52 and thus noise (colliding noise of the worm gear 52) caused by wobbling of the worm gear 52 in the axial direction and colliding with a component on either side in the axial direction can be restrained.

In this embodiment, a spring washer which is the brake member 53 is attached to the compound gear 57 (second gear) that is a rotation transmission member located on an upstream side of the power transmission path with respect to the drive wheel 6 and thereby a rotation load is applied. In a case that a rotation load is applied to a gear on an upstream side with respect to the drive wheel 6, a required rotation load is smaller than a case that a rotation load is applied to the drive wheel 6. Therefore, the size of the brake member 53 can be reduced.

In this embodiment, a spring washer which is an elastic member is used as the brake member 53. When an elastic member is used, the composite gear 57 and the brake member 53 are easily contacted with each other to apply a rotation load. Therefore, noise can be restrained. Further, the brake member 53 is contacted with an end face on the other side "L3*b*" in the third axial line "L3" direction which is a rotation axis direction of the composite gear 57 (loaded member) and thus rattling in the rotation axis direction of the composite gear 57 can be eliminated. Further, when the baffle drive mechanism 5 is to be assembled to the cover 3, the brake member 53 (spring washer) can be assembled together with the composite gear 57 and, after that, the brake member 53 can be assembled to the damper device 1 only by fitting the frame 2 to the cover 3. Therefore, the brake member 53 can be easily incorporated. In addition, the brake member 53 is disposed in a portion where the composite gear 57 and the frame 2 are faced each other and thus planar arrangement of the rotation transmission mechanism 55 is not required to be changed. Therefore, design modification for adding the brake member 53 can be reduced.

In this embodiment, the drive wheel 6 is provided with a plurality of the drive teeth 66 which are disposed in a stepped shape on an outer peripheral face of the drive wheel 6, and the driven wheel 7 is provided with a plurality of the driven teeth 76, which are sequentially engaged with the plurality of the drive teeth 66 accompanied with turning of the drive wheel 6, on an outer peripheral face of the driven wheel 7 in a stepped shape. Therefore, the drive teeth 66 and the driven teeth 76 are sequentially engaged with each other to drive the driven wheel 7 and, after that, when engagement of the drive tooth 66 and the driven tooth 76 is released, the driven wheel 7 can be turned in a reverse direction. Therefore, the driven wheel 7 can be reciprocatively turned by using a motor rotating in only one direction. Further, the driven wheel 7 is sufficient that a portion where the driven teeth 76 that is an engagement part are formed is reciprocatively turned with respect to the drive wheel 6 and thus a useless portion can be eliminated by forming the driven wheel 7 in a fan shape. Therefore, the size of the driven wheel 7 can be reduced and a space saving can be attained.

In this embodiment, a plurality of the cam faces 67 on which a plurality of the driven teeth 76 is sequentially slid is provided, and an outer diameter of each of the plurality of the cam faces 67 is reduced from one side in a circumferential direction to the other side and, in addition, the cam faces 67 adjacent to each other in the circumferential direction are structured so that reducing rates in the circumferential direction of the outer diameters of the cam faces 67 are different from each other. Therefore, a turning speed of the driven wheel 7 can be changed and, for example, it may be structured that the driven wheel 7 is turned slowly at first and then its turning speed is gradually increased. Further, even in a case that a turning speed is changed as described above, noise caused by disturbance of turning of the drive wheel 6 can be restrained when a turning speed of the driven wheel 7 is varied.

(Modified Embodiments)

Figure 11:
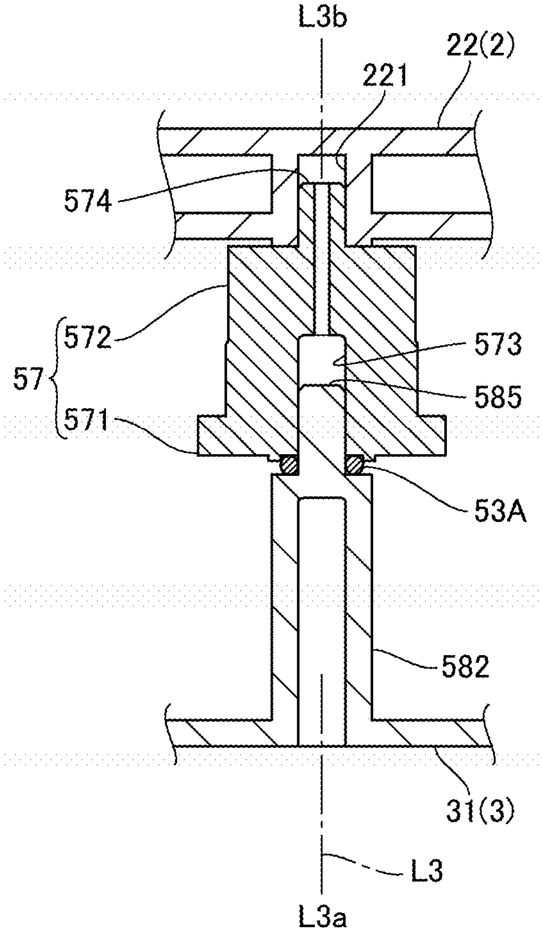
FIG. 11 is an explanatory view showing a brake member in a modified embodiment.

(1) A brake member 53 which is different from the above-mentioned embodiment may be used. FIG. 11 is an explanatory view showing another brake member in a modified embodiment. In FIG. 11, a brake member 53A in a modified embodiment is an O-ring. The brake member 53A is attached between an end face on one side "L3*a*" in the third axial line "L3" direction of the composite gear 57 and an end face of the second rotation support part 582. In accordance with an embodiment of the present invention, an O-ring may be disposes between the partition 22 and the composite gear 57. Alternatively, a spring washer may be disposed between the composite gear 57 and an end face of the second rotation support part 582.

(2) A spring washer different from the embodiment shown in FIG. 2 and FIG. 3 may be used as the brake member 53. For example, the spring washer shown in FIG. 2 and FIG. 3 is formed in a shape that two portions on one side and the other side in a radial direction of a ring-shaped metal plate are resiliently bent to the same side. However, another spring washer may be used which is formed in a shape that an outer circumferential edge of a ring-shaped metal plate is inclined in a taper shape over the entire periphery. Further, a spring washer in a twisted shape may be used in which one portion in a circumferential direction of a ring-shaped member is cut and end parts on both sides at the cut portion are shifted from each other in the axial line direction. Further, a spring washer may be made of material other than metal. For example, a spring washer may be made of resin.

(3) A gear to which a rotation load is applied by the brake member may be the drive wheel 6 or the worm wheel 56. In a case that a rotation load is applied to the worm wheel 56, a rotation load is applied to a gear which is the nearest to the worm gear 52 and thus a required rotation load becomes the smallest. Therefore, the size of the brake member 53 can be reduced. In accordance with an embodiment of the present invention, it may be structured that a brake member is disposed at a plurality of positions in the rotation transmission mechanism 55 and rotation loads are applied to a plurality of positions.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotation transmission mechanism structured to transmit power from a drive source, the rotation transmission mechanism comprising:

a plurality of rotation transmission members, the plurality of rotation transmission members comprising a drive wheel and a driven wheel; and an urging member structured to urge the driven wheel in a reverse direction to a rotational direction by power of the drive source;

wherein the drive wheel and the driven wheel comprise engagement parts structured to transmit turning of the drive wheel to the driven wheel;

wherein the drive wheel comprises a cam face forming part, the engagement part of the driven wheel being slid on the cam face forming part at a rotational position where the engagement parts are not engaged with each other; and wherein a brake member structured to generate a rotation load is disposed in a range, on an upstream side of a power transmission path, including the drive wheel with respect to the driven wheel in the power transmission path transmitting the power of the drive source.

2. The rotation transmission mechanism according to claim 1, wherein the drive source is a motor, the plurality of the rotation transmission members further comprises a worm gear, the worm gear being connected with an output shaft of the motor, and the brake member is provided on a downstream side of the power transmission path with respect to the worm gear.

3. The rotation transmission mechanism according to claim 2, wherein the plurality of the rotation transmission members further comprises a first gear engaging with the worm gear and a second gear disposed between the first gear and the drive wheel in the power transmission path, and the brake member applies a rotation load to the second gear.

4. The rotation transmission mechanism according to claim 1, wherein the brake member is an elastic member.

5. The rotation transmission mechanism according to claim 4, wherein the brake member is structured to contact with an end face on one side or an other side in a rotation axial direction of a loaded member, the rotation load being applied to the loaded member among the plurality of the rotation transmission members.

6. The rotation transmission mechanism according to claim 5, wherein the brake member is a spring washer.

7. The rotation transmission mechanism according to claim 1, wherein the cam face forming part comprises a plurality of cam faces, and the engagement part of the driven wheel is sequentially slid on the plurality of the cam faces accompanied with turning of the drive wheel.

8. The rotation transmission mechanism according to claim 7, wherein each of the drive wheel and the driven wheel comprises a plurality of the engagement parts, and the plurality of the engagement parts is formed at different positions in a rotation axial direction in each of the drive wheel and the driven wheel.

9. The rotation transmission mechanism according to claim 8, wherein the drive wheel comprises a plurality of drive teeth, the plurality of drive teeth being provided in a stepped shape on an outer peripheral face of the drive wheel, the driven wheel comprises a plurality of driven teeth, the plurality of driven teeth are provided in a stepped shape on an outer peripheral face of the driven wheel so as to sequentially engage with the plurality of the drive teeth accompanied with turning of the drive wheel, and the engagement part is structured of a pair of the drive teeth and the driven tooth.

10. The rotation transmission mechanism according to claim 7, wherein outer diameters of the plurality of the cam faces are reduced from one side to an other side in a circumferential direction, and the cam faces adjacent to each other in the circumferential direction are structured so that reducing rates in the circumferential direction of the outer diameters of the cam faces are different from each other.

11. The rotation transmission mechanism according to claim 7, wherein the drive source is a motor, the plurality of the rotation transmission members further comprises a worm gear, the worm gear being connected with an output shaft of the motor, the brake member is an elastic member which is provided on a downstream side of the power transmission path with respect to the worm gear, the elastic member is provided between an end face in a rotation axial direction of a loaded member, the rotation load being applied to loaded member among the plurality of the rotation transmission members, and a rotation support part, the rotation support part supporting rotation of the loaded member, and the elastic member is structured to contact with the loaded member to apply a brake force to the loaded member.

12. The rotation transmission mechanism according to claim 11, wherein the engagement part of the drive wheel comprises a plurality of drive teeth, the plurality of drive teeth being arranged in a stepped shape at positions different from each other in a rotation axial direction on an outer peripheral face of the drive wheel, the engagement part of the driven wheel comprises a plurality of driven teeth, the plurality of driven teeth being arranged in a stepped shape at positions different from each other in a rotation axial direction on an outer peripheral face of the driven wheel so as to sequentially engage with the plurality of the drive teeth accompanied with turning of the drive wheel, and the engagement part is structured of a pair of the drive teeth and the driven tooth.

13. The rotation transmission mechanism according to claim 1, wherein the driven wheel is formed in a fan shape when viewed in a rotation axial direction of the driven wheel.

14. A damper device comprising:

the rotation transmission mechanism defined in claim 1;

a frame comprising an opening part;

a motor structured to drive the drive wheel; and a baffle, wherein turning of the driven wheel is transmitted to the baffle to open and close the opening part.

15. The damper device according to claim 14, wherein the motor is structured to rotate in only one direction.

16. The damper device according to claim 14, wherein the urging member is structured to urge the baffle in an open direction or a closing direction with respect to the opening part and urges the driven wheel through the baffle.

17. The damper device according to claim 16, wherein the plurality of the rotation transmission members further comprises a worm gear, the worm gear being connected with an output shaft of the motor, and the brake member is provided on a downstream side of the power transmission path with respect to the worm gear.

18. The damper device according to claim 17, wherein the plurality of rotation transmission members further comprises a first gear engaging with the worm gear and a second gear disposed between the first gear and the drive wheel in the power transmission path, and the brake member applies a rotation load to the second gear.

19. The damper device according to claim 16, wherein the cam face forming part comprises a plurality of cam faces, and the engagement part of the driven wheel is sequentially slid on the plurality of the cam faces accompanied with turning of the drive wheel.

20. The damper device according to claim 19, wherein the plurality of the rotation transmission members further comprises a worm gear, the worm gear being connected with an output shaft of the motor, the brake member is an elastic member, the elastic member being provided on a downstream side of the power transmission path with respect to the worm gear, the elastic member is provided between an end face in a rotation axial direction of a loaded member, the rotation load being applied to the loaded member among the plurality of the rotation transmission members, and a rotation support part, the rotation support part supporting rotation of the loaded member, and the elastic member is contacted with the loaded member to apply a brake force to the loaded member.

21. The damper device according to claim 20, wherein the engagement part of the drive wheel comprises a plurality of drive teeth, the plurality of drive teeth being arranged in a stepped shape at positions different from each other in a rotation axial direction on an outer peripheral face of the drive wheel, the engagement part of the driven wheel comprises a plurality of driven teeth, the plurality of drive teeth being arranged in a stepped shape at positions different from each other in a rotation axial direction on an outer peripheral face of the driven wheel so as to sequentially engage with the plurality of the drive teeth accompanied with turning of the drive wheel, and the engagement part is structured of a pair of the drive tooth and the driven tooth.

22. The damper device according to claim 14, further comprising a case comprising rotation support parts, the rotation support parts rotatably supporting the plurality of the rotation transmission members, wherein the brake member is disposed at least one position between the case and the plurality of the rotation transmission members.

* * * * *